United States Patent

[15] 3,647,345

Claessens et al.

[45] Mar. 7, 1972

[54] MOLDING AND TRANSFERRING SYSTEM FOR CERAMIC ARTICLES

[72] Inventors: Frans D. Claessens; Theodore F. Hein, both of Maastricht, Netherlands

[73] Assignee: N. V. Koninklijke Sphinx-Ceramique v/h Petrus Regout, Boschstraat, Maastricht, Netherlands

[22] Filed: May 18, 1970

[21] Appl. No.: 38,272

Related U.S. Application Data

[63] Continuation-in-part of Ser. No. 592,448, Nov. 7, 1966, abandoned.

[30] Foreign Application Priority Data

Nov. 17, 1965 Netherlands..........................6514922

[52] U.S. Cl..............................................425/439, 198/20
[51] Int. Cl............................................................B28b 15/00
[58] Field of Search................25/2, 1 R, 41 R, 41 C, 142 D, 25/142 G, 142 B, 142 R; 18/4 P, 4 R, 4 C; 198/20

[56] References Cited

UNITED STATES PATENTS

| 2,732,584 | 1/1956 | Bishop | .....................18/4 C |
| 3,448,497 | 6/1969 | Arnold et al. | ............................25/2 X |
| 2,655,710 | 10/1953 | Roensch et al. | ....................25/41 R X |

*Primary Examiner*—J. Spencer Overholser
*Assistant Examiner*—Dewalden W. Jones

*Attorney*—Snyder and Butrum

[57] ABSTRACT

Two trucks are caused to move in side-by-side relation on a pair of parallel tracks, one truck carrying top and bottom mould parts pivoted on opposite sides of the truck and having followers remote from the respective pivot axes. The other truck carries a horizontal support member pivoted on one side of this truck coaxial with the pivot axis of the bottom mould part on the first truck. The support member also has a follower remote from its pivot axis and which is spaced from it by the same amount as is the spacing between the follower of the bottom mould part and its pivot axis. As the truck moves along, the follower of the top mould part engages a carriage movable along an arcuate track having its center of curvature on the pivot axis of the top mould part and which carries the top mould part to an upright position. Thereafter the follower of the top mould part enters a fixed guide which holds it in the upright position. Beyond this is a second arcuate track stradding the paths of the trucks and having its center of curvature coincidental with the pivot axes of the bottom mould part and the support member. A carriage on this second track first engages the follower of the support member to swing it over onto the bottom mould part and then to pick up the follower of the bottom mould part as well and, during its return movement, to swing both the bottom mould part and the support member onto the other truck to transfer a moulded article onto the support member of such other truck. A further arcuate track and carriage then return the bottom mould part back onto the first truck, and a still further arcuate track and carriage then returns the top mould part onto the bottom mould part.

11 Claims, 15 Drawing Figures

PATENTED MAR 7 1972

INVENTOR
FRANS D. CLAESSENS
and
THEODORE F. HEIN

BY

Snyder & Bulrum   ATTORNEY

MOLDING TRANSFERRING SYSTEM FOR CERAMIC ARTICLES

This application is a continuation-in-part of application Ser. No. 592,448, filed Nov. 7, 1966, and abandoned concurrently herewith.

CROSS-REFERENCE TO RELATED APPLICATIONS

This application is related to copending applications Ser. No. 592,446 and Ser. No. 592,448 filed Nov. 7, 1966 and Nov. 7, 1966 respectively.

BACKGROUND OF THE INVENTION

In the production line manufacture of relatively large ceramic articles such as wash basins and the like, the space required for the production line may assume quite large proportions. This is due in part to the very nature of the various stages of the process and also to the conventional techniques for opening, closing and in general moving the mould parts relative to each other; and also to the conventional methods of effecting transfer of the moulded articles after they have attained the requisite green strength onto a further line whereat the white strength thereof is attained. Due to the relatively large size and weight of the mould parts and the transfer members involved, conventional techniques for relatively moving these members to effect the requisite operations have required a relatively great length of the production line such as may cause the space required to be inordinately large.

BRIEF SUMMARY OF THE INVENTION

Accordingly, the present invention is directed to a production line system for moulding ceramic articles and the like wherein the complete operation is effected in a minimum of space; the space requirement is minimized through the medium of improved transfer techniques and improved mechanism for effecting the requisite relative movements between the various component parts along relatively short sections of the production line.

Essentially, the above objective is obtained by the provising arcuate track sections associated with the production line equipment in which the arcuate track sections have their centers of curvatures aligned along axes of pivotal motion of the respective members which are to be affected thereby, there being carriage members movable back and forth along these arcuate track sections and which engage followers on the pivoted members to swing them back and forth as required. In this way, the requisite movements are effected along very short sections of the track or production line movement.

DETAILED DESCRIPTION OF THE INVENTION

The system comprises a first endless guide track 1 extending through two tunnels 2 and 3. A united row of trucks 4 is disposed on the guide track 1, and FIGS. 2 to 9 each show one such truck in different positions. The trucks 4 are driven by chains 7 passing over reversing wheels 5 and 6. A third tunnel 8 is situated next to the track 1. The tunnels 2, 3 and 8 can be heated for use as drying tunnels. An adequate air circulation is maintained in the tunnels 2, 3 and 8 during drying. Part of a second endless track 9 extends through the tunnel 8, while another part thereof is situated on top of the tunnel 8. A united row of trucks 10 moves along the track 9. Space is saved by this construction of the track 9, although the tracks 1 and 9 may extend at the same level.

Figure 1:
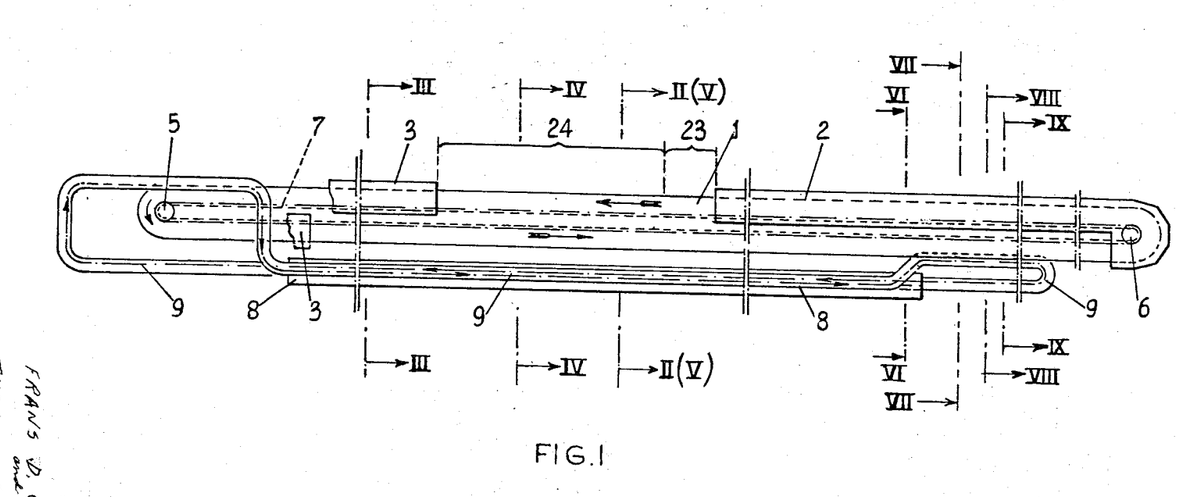
FIG. 1 is a diagrammatic top plan view of a system for moulding ceramic articles.
Figure 2:
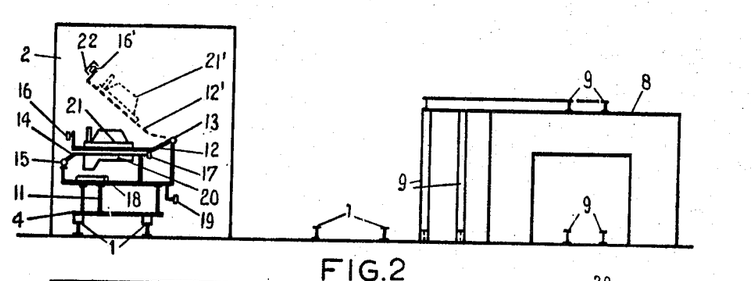
FIG. 2 is a cross section on the line II—II in FIG. 1.

FIGS. 3 to 9 each show one of the trucks 4 and 10 respectively of the two rows in different positions as they pass along the tracks 1 and 9 respectively, while FIG. 2 indicates just the truck 4, since the associated truck 10 is not visible in this cross section. As will be apparent from FIG. 2, the truck 4 consists of a frame 11 to which a top part 12 is pivotally secured by means of the pivot 13. A bottom part 14 is also pivotally secured to the frame 11 by means of a pivot 15. At its side remote from the pivot 13, the part 12 has a follower 16 in the form of a roller. On the side remote from the pivot 15, the part 14 has a follower 17 also in the form of a roller.

The frame 11 of truck 4 also has a horizontal pivot 18 which forms an angle with the direction of movement of the truck 4 along the track 1. At the side remote from the pivot 18, the tope part of the frame 11 is provided with a follower 19 in the form of a roller. The pivotable part 14 bears the bottom half 20 of a mould, the top half 21 of which is secured in the part 12. While the truck 4 is moving inside the tunnel 2, the follower 16 assumes position 16' and runs through a fixed guide 22, so that the top part 12' and the top half 21' of the mould are held in the position shown in broken lines.

When the truck 4 leaves the tunnel 2, the mould 20, 21 is closed and is made ready to receive the moulding material. This takes place over portion 23 of the travel. In the next portion 24 of the travel, the mould is filled with the slip, although this is not shown in detail. An automatic filler can be used for this purpose, the filler periodically moving in synchronism with the mould. After pouring, the mould filled with the slip moves through the tunnel 3.

Figure 3:
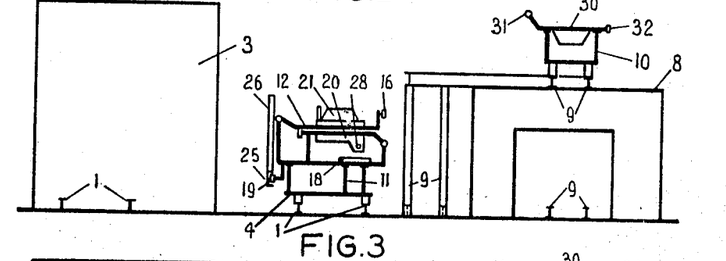
FIG. 3 is a cross section on the line III—III in FIG. 1.
Figure 4:
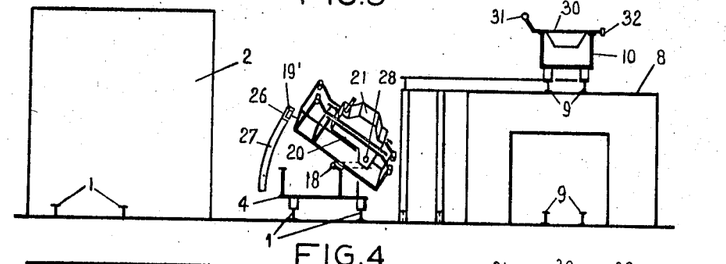
FIG. 4 is a cross section on the line IV—IV in FIG. 1.
Figure 5:
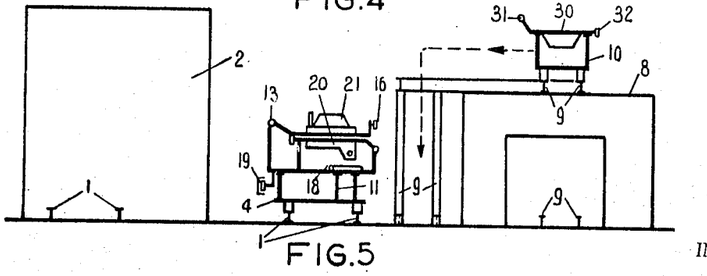
FIG. 5 is a cross section on the line V—V in FIG. 1.

In the position shown in FIG. 3, the truck 4 has just left the tunnel 3. Any excess slip can now be removed from the mould, a guide 25 being used for the roller 19. The first part of this guide 25 extends upwardly at an angle and then joins a horizontal portion 26 which is then followed by a portion 27 which extends downwardly at an angle. By means of the follower, the top portion of the frame 11 together with the mould halves 20 and 21 pivots about the pivot 18 so that the mould is tilted, one corner thus being lower than the others. A drain aperture 28 is provided at this lowest point of the bottom half 20 of the mould and the excess slip can escape through this drain aperture. An automatic system may be used to remove the plug from the aperture 20. The mould can therefore leak while the roller 19 in position 19' follows the horizontal guide portion 26. The mould 20, 21 is finally returned to the horizontal position by means of the downwardly extending portion 27 of the guide. This position is shown in FIG. 5. The guide 26 has various upwardly and downwardly extending portions 25, 27, so that the place where the slip is drained can be changed as necessary.

The mould then moves on in the position shown in FIG. 5, in which the product dries in the mould.

Figure 6:
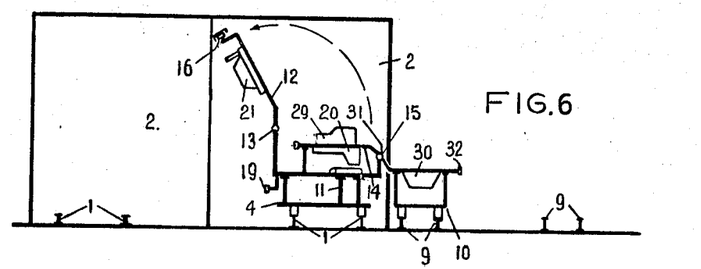
FIG. 6 is a cross section on the line VI—VI in FIG. 1.
Figure 7:
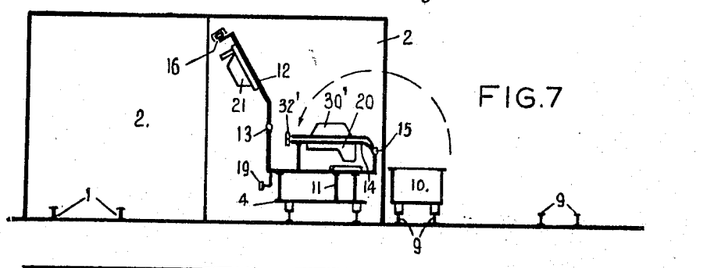
FIG. 7 is a cross section on the line VII—VII in FIG. 1.
Figure 8:
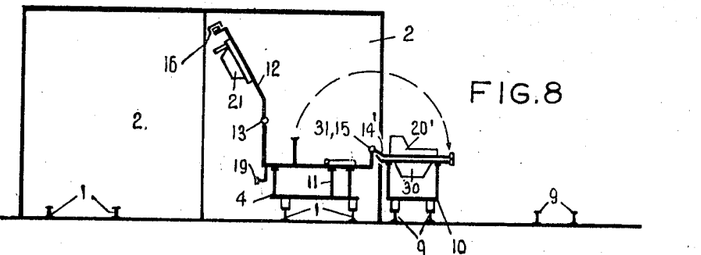
FIG. 8 is a cross section on the line VIII—VIII in FIG. 1.

After drying, the top part 12 can be swung upwards together with the top half 21 of the mould as shown in FIG. 6, whereafter the truck 4 is moved on and the moulded product 29 is situated on the bottom half 20 of the mould.

A truck 10 with a bearer 30 moves over the track 9. The bearer 30 is provided with a shaft 31 extending in parallel relationship to the direction of movement of the truck. At the end of the part of track 9 situated on the tunnel 8 the truck 10 moves down into the position shown in FIG. 6. It now follows a path in which the tracks 1 and 9 are parallel to one another. During the downward movement, the shaft 31 comes to lie in two bearings which are open at the top and which form part of the truck 4 and are coaxial with the pivot 15. The trucks 10 and 4 are coupled together in the position shown in FIG. 6. To enable the product 29 to be removed from the mould, the bearer 30 is pivoted about the pivot 15 into the position 30' shown in FIG. 7, by means of a guide system not shown in detail in FIGS. 6 to 9. The bearer 30 is provided with a follower 32 which assumes the position 32' in these conditions. The bearer 30' and the part 14 together with the bottom half 20 of the mould are then swung back about the pivot 15 into the position 14' shown in FIG. 8, in which the product 29 comes to lie on the bearer 30 and the bottom half 20' lies above the product 29. The mould half 20' together with the part 14' is then swung back into the position shown in FIG. 9. The product 29' is then left on the bearer 30. The trucks 10 and 4 are then decoupled, the shaft 31 being lifted out of the bearings on truck 4 by means of an upwardly extending portion (not shown) of track 9. The tracks 9 and 1 then diverge from one another. The truck 10 then runs back through the tunnel 8 in which the product 29 is dried to such an extent that it can be taken off the truck 10 when the latter leaves the tunnel 8. The truck 10 with the bearer 30 then moves on and can subsequently cooperate with another truck 4.

Figure 9:
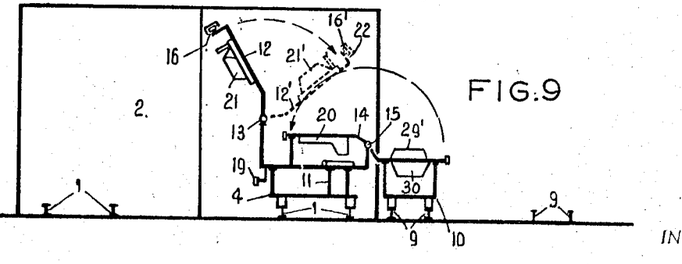
FIG. 9 is a cross section on the line IX—IX in FIG. 1.

The truck 4 also moves on, the top part 12 together with the mould half 21 being brought into the position 12', 21' shown in broken lines in FIG. 9. The follower 16 then assumes the position 16' in the fixed guide 22. The truck 4 moves on through the tunnel 2 with the mould halves 20 and 21' half open. When it leaves the tunnel 2, the truck 4 is again in the position shown in broken lines in FIG. 2, whereafter the cycle can be repeated from the start.

After each mould 20, 21 has been successively used a number of times, the moulds must be dried. To this end, the guide 22 continues without interruption along the entire track 1 and both tunnels 2 and 3 are heated. The opened moulds then pass through the drying tunnels a number of times. When they are sufficiently dry, moulding can be carried out again. Moulding is preferably carried out during the daytime and the moulds dried at night.

Figure 10:
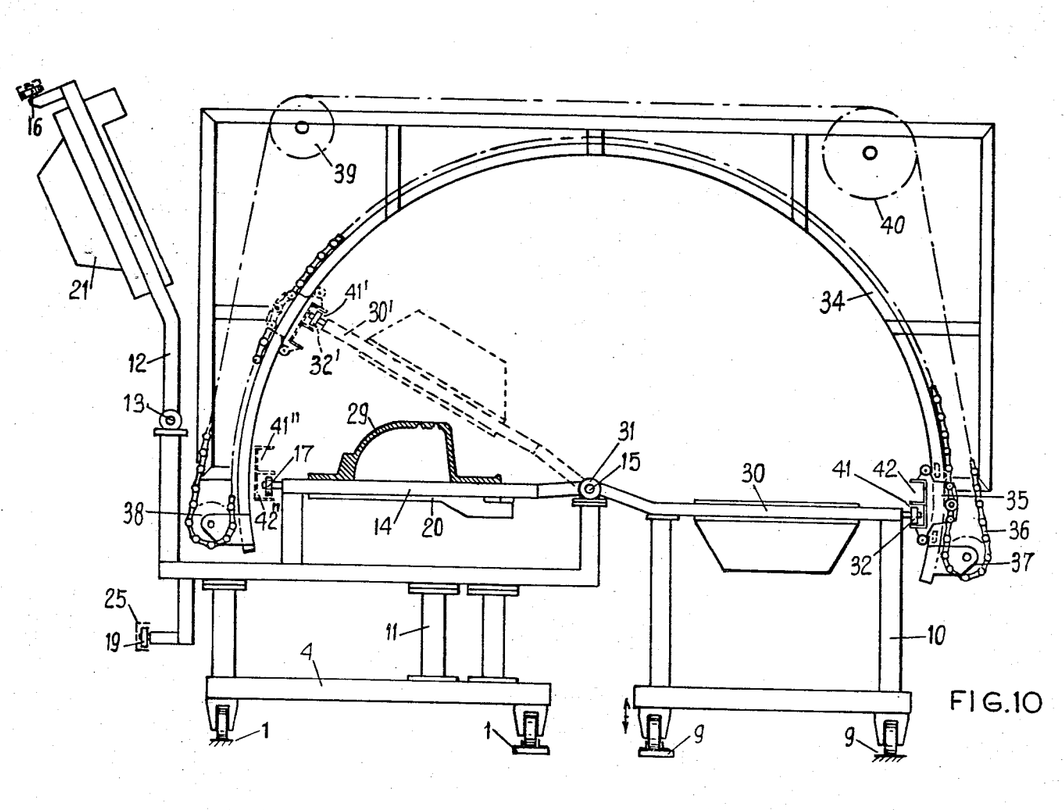
FIG. 10 is a cross section through a system for removing the product from the mould.

FIG. 10 is a cross section transversely of the direction of the tracks 1 and 9, showing a mechanism for removing the moulding 29 from the bottom mould half 20. The mechanism comprises a circular guide 34 extending over the two tracks 1 and 9 and with its center coinciding with the center of the pivots 15 and 31 when the trucks 4 and 10 are situated beneath the arc 34. A double guide section 35 can move along the arc 34 and is driven by a chain 36 which is taken over reversing wheels 37 and 38 at the end of the arc 34 and sprocket wheels 39 and 40. When considered in the direction of movement of the trucks 4 and 10, the guide section 35 first comprises a first guide 41 for the roller 32 of bearer 30 and when considered in the direction of movement of the trucks 10 and 4 its second portion is provided with a second guide 42 which can cooperate with the roller 17 of part 14 in which the mould half 20 rests. The mechanism operates as follows:

On the forward movement of the trucks 4 and 10, the roller 32 enters the first guide 41. As soon as the roller 32 is in said guide 41, the chain 36 is driven and moves the guide 41 via position 41' to the position 41'', which is indicated by broken lines. In this position the bearer 30 is situated above the product 29. The roller 17 then comes into the second guide 42'. The chain 36 is then driven in the opposite direction and the mould 20 with the product 29 and the bearer 30 together move to the right, and when the guide section 35 again reaches the right-hand end position the product 29 with the mould half 20 above it rests on the bearer 30. The rollers 32 and 17 then leave the guide section 35. The roller 17 then cooperates with a corrugated guide, by means of which the mould 20 is moved up and down with respect to the product 29 in order to facilitate release. The roller 17 then cooperates with a corresponding guide section which moves the part 14 and the mould 20 back to the truck 4, as schematically indicated in FIG. 9.

Appropriate guide sections are provided along another portion of the track 1 to operate the part 12 with the top mould half 21. These guide sections move along arcs whose center coincides with the center of the pivot 13.

Figure 11:
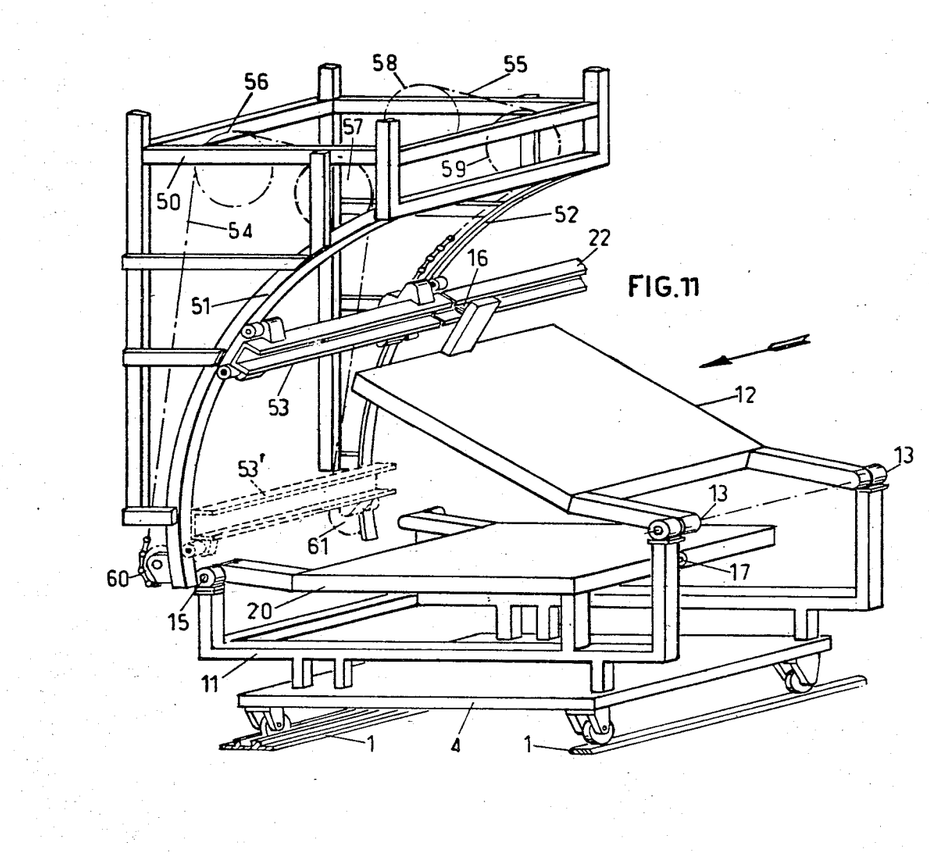
FIG. 11 is a perspective view of a truck shown diagrammatically in the position just before that shown in FIG. 2.

In FIG. 11, corresponding to FIG. 2, a frame 50 is shown supporting the circular guides 51 and 52, the centers of which coincide with the axis of the pivots 13 when the truck 4 is situated beneath the guides 51 and 52. The carriage 53 is movable along the guides 51 and 52 and is driven by suitable means such as the endless chains 54 and 55, which as shown, may be trained about the respective sprockets 56, 57, 58 and 59 and which are driven through sprocket wheels 60 and 61. The movement of the truck 4 along the rails 1 is in the direction of the arrow. The follower 16 travels along the fixed guide 22 so that the top part 12 of the mould is held in the open position until the follower 16 enters the guide or carriage section 53, whereafter the guide section is moved downwards by means of the chains 54 and 55 to the dashed line position indicated at 53'. During this downward movement the follower 16 continues to move in the direction of the arrow through the guide section 53. When the carriage 53 reaches its lowermost position, the top part 12 rests on the lower part 20 of the mould, and on the further movement of the truck 4 the follower 16 leaves the carriage 53 whereafter the carriage is returned to the full line position shown in FIG. 11 so that the top part 12 of the next mould can be lowered into position.

Figure 12:
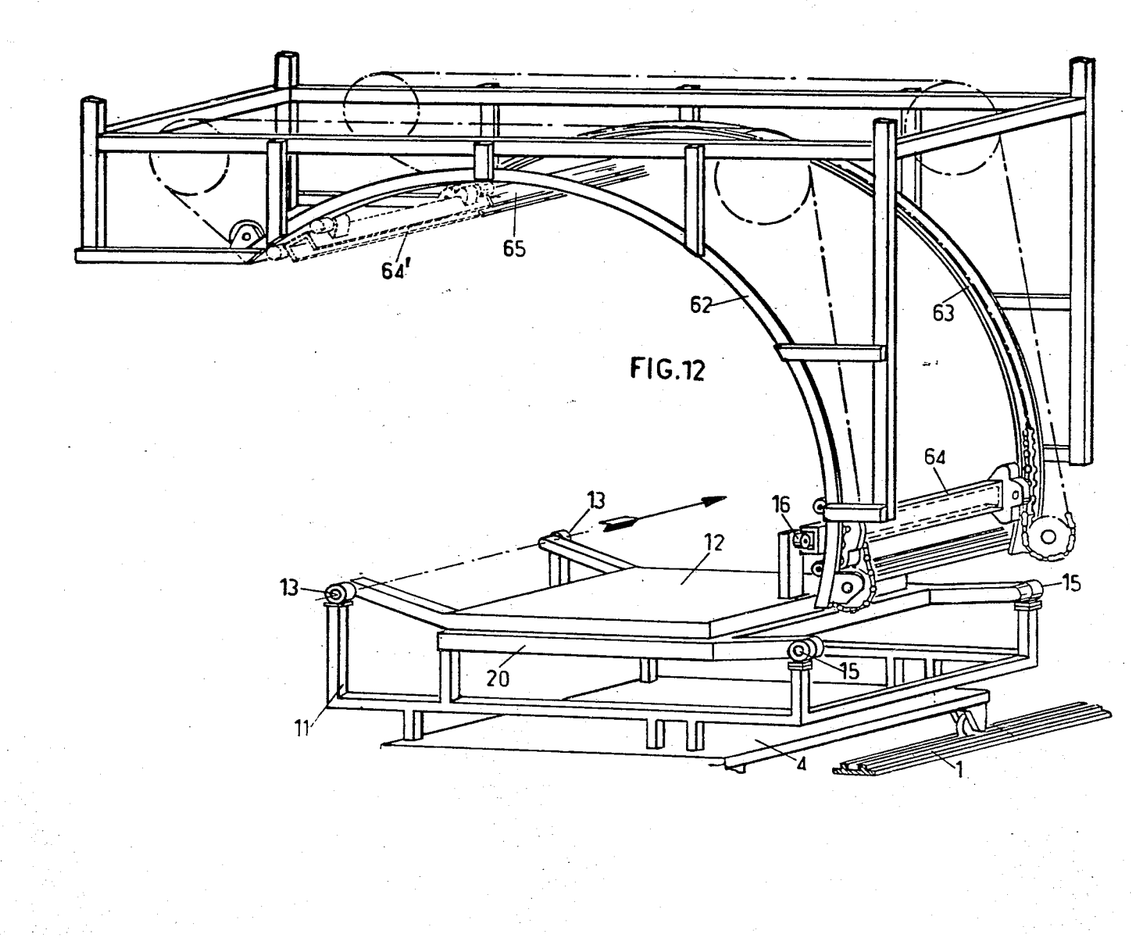
FIG. 12 is a perspective view of a truck shown diagrammatically in a position corresponding with said of FIG. 6.

In FIG. 12 the truck 4 is shown moving in the direction of the arrow along the rail, with the upper half 12 of the mould still resting on the lower half 20. FIG. 12 shows a station for swinging the upper part 12 of the mould into the open position after the article has been moulded and has attained sufficient green strength to be transferred. There are again circular guides 62 and 63 along which a carriage may move in a fashion similar to that described in connection with FIG. 11. The center of curvature of the circular guides 62 and 63 coincides with the axis of the pivots 13 when the truck is below the guides 62 and 63. As soon as the follower 16 enters the guide section 64, the guide section is moved along the guide 62 and 63 into the dashed line position 64', during which movement the follower 16 continues movement in the direction of the arrow along the guide section 64. In the dashed line position, the follower 16 leaves the carriage and enters a fixed guide section 65, so that during further movement of the truck 4 the upper half 12 is maintained in the open position.

Figure 13:
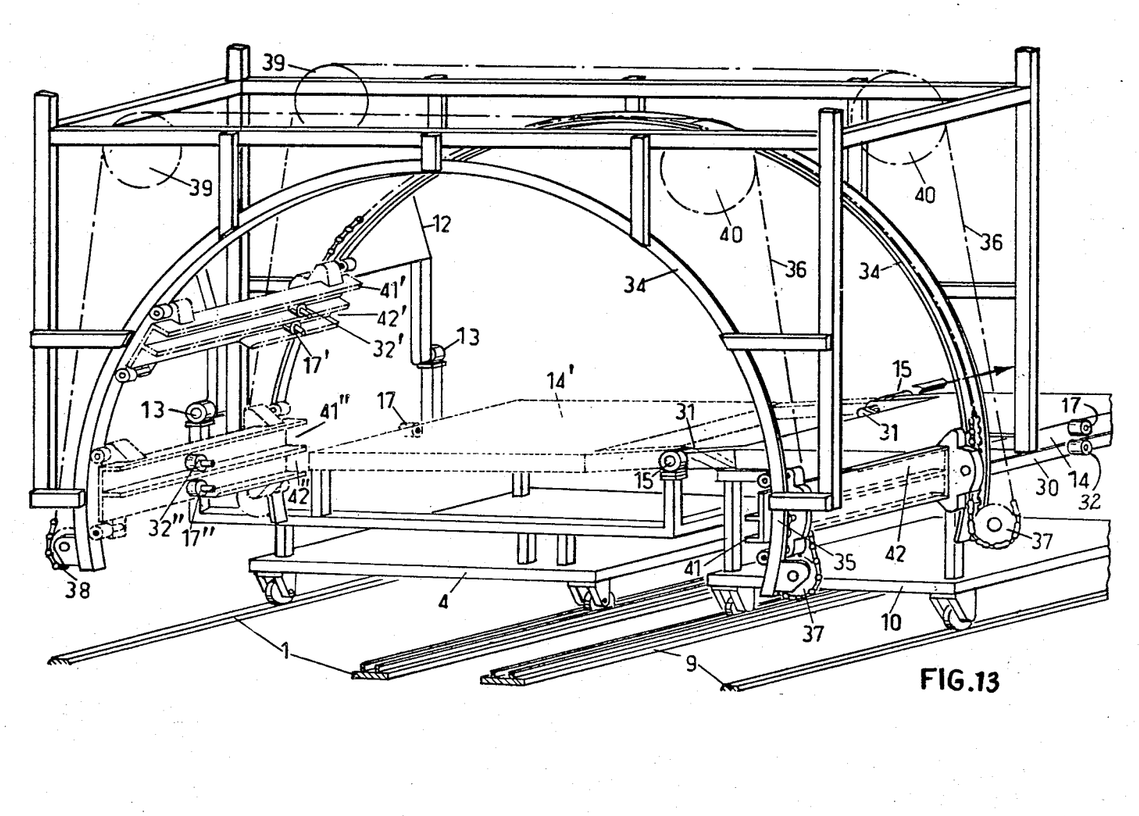
FIG. 13 a perspective view of trucks diagrammatically in a position corresponding with that of the FIG. 7 and 8.

FIG. 13 shows a perspective view which corresponds with the cross section shown in FIG. 10, wherein the trucks 4 and 10 are shown moving along the respective rails 1 and 9. The trucks are shown in a position where they have just entered the arcuate track formed by the circular guides 34. The lower half of the mould on the truck 4 is shown in dotted lines, as indicated at 14', and is shown in the position relative to the truck 4 before the follower 17 has entered the guide 42''.

The way in which the mechanism operates has been already described in connection with FIG. 10.

Figure 14:
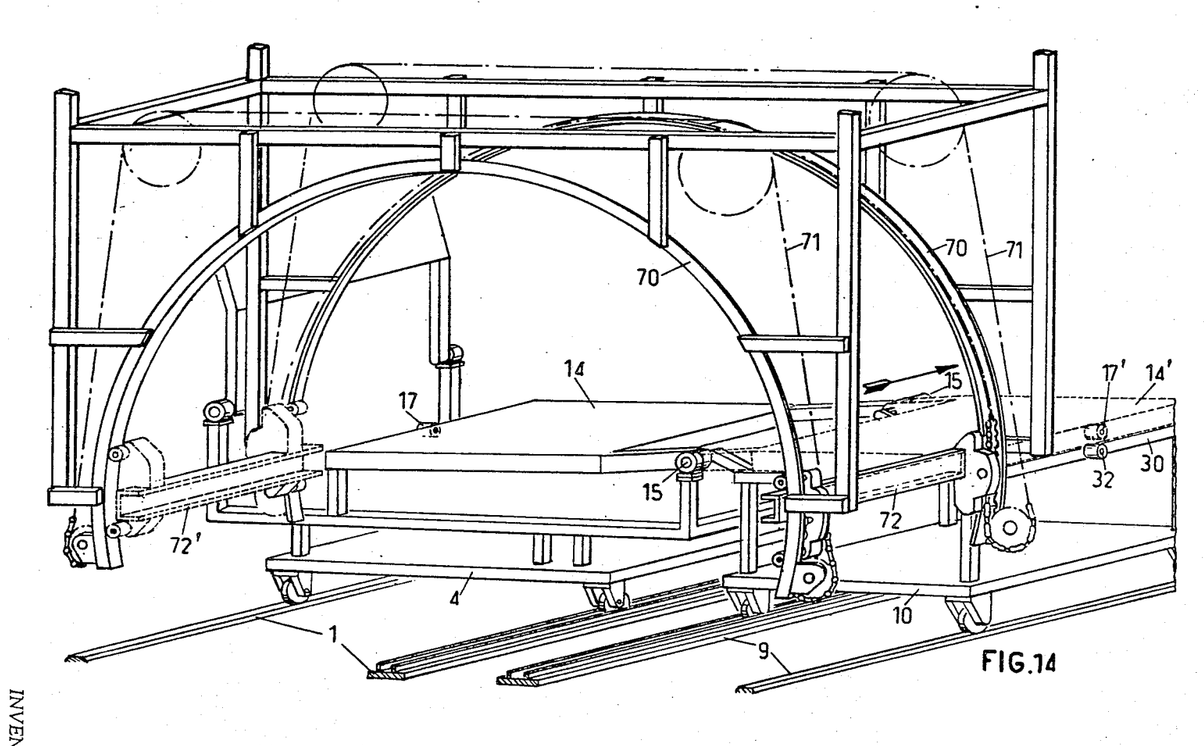
FIG. 14 a perspective view of the trucks in the position shown in FIG. 9 with solid lines.

FIG. 14 shows a station in which part 14 is moved back to the truck. In this station circular guides 70 are arranged such that by means of chains 71, the carriage or guide section 72 may be moved into the dashed line position 72'. As soon as a follower as shown at 17' enters the guide section 72 this guide section moves to the position 72' so that the bottom mould part is moved back from the truck 10 to the position 14 on the truck 4.

Figure 15:
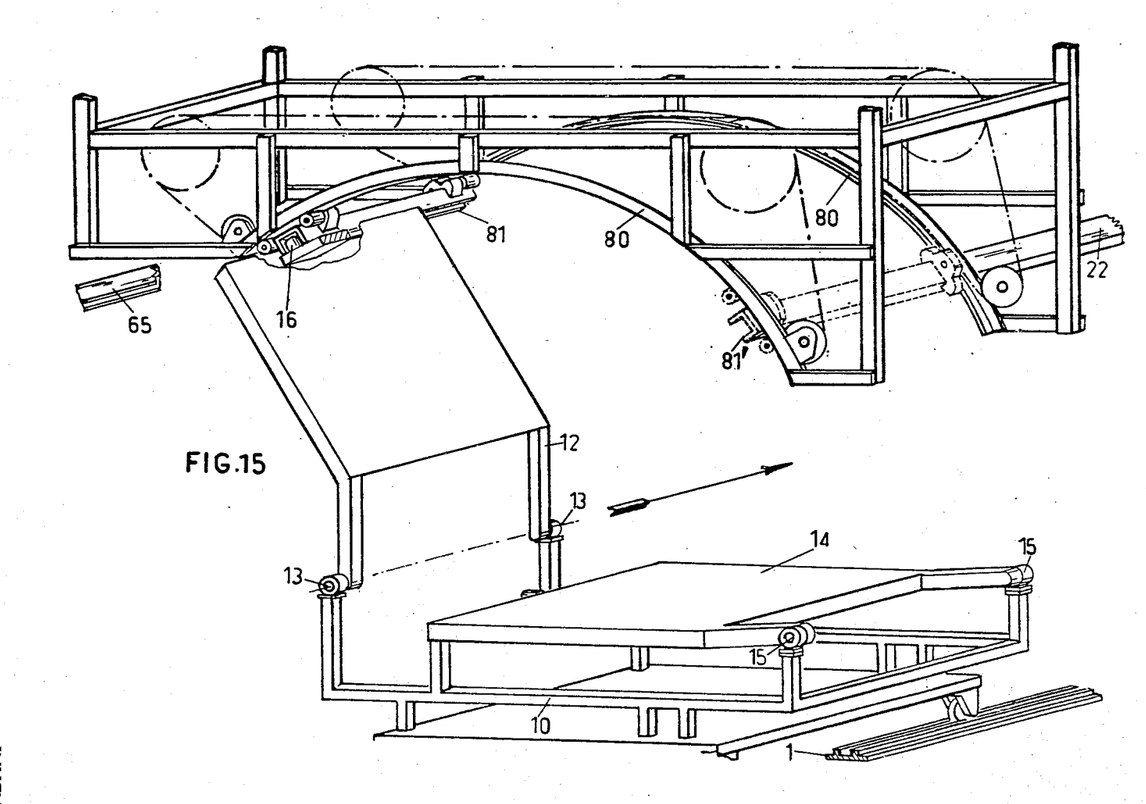
FIG. 15 is a perspective view showing the truck in the position shown in FIG. 9 with dotted lines.

In FIG. 15 the truck 10 is shown moving along the rails 1 in the direction of the arrow. The arcuate track or guides 80 are provided with a guide section or carriage 81 movable into a position 81'. In the position 81 this guide section is in line with the guide 65 from FIG. 12, the guide 65 maintaining the portion 12 in the upright position. The guide section 81' is in line with the fixed guide 22, so that as soon as the follower 16 enters the guide section 81, it moves to the position 81'. Thereafter the part 12 of the mould is swung into the position shown in FIG. 11.

What we claim is:

1. In an article handling system, in combination, article-handling means moveable continuously along a given path, said article-handling means including a supporting base and a member pivoted to said base about an axis extending in the direction of movement of said article-handling means, said member having a follower remote from said axis, elongated guide means disposed along a portion of said path for receiving said follower, and means for moving said guide means back and forth along an arcuate path having said axis as its center when said follower is captive therewithin whereby to pivot said member about its axis as said article-carrying means is moving along said path, said article handling means comprising a mold, said mold having a bottom part and said member constituting a top part, the top and bottom parts defining a mold cavity therebetween.

2. In the article handling system according to claim 1, wherein said bottom part is pivoted to said base about a second axis parallel to the first mentioned axis, and said bottom part having a second follower remote from said second axis, second elongate guide means disposed along a second portion of said closed path for receiving said second follower, and means for moving said second guide means back and forth along an arcuate path having said second axis as its center when said second follower is captive therewithin.

3. In the article handling system according to claim 2, including article receiving means moveable along a second path different from the first mentioned path but having a section lying alongside a portion of said first path, said article receiving means and said article handling means being moveable in synchronism along said section and said portion respectively, and said second axis being between said first and second paths whereby an article is transferred from said article handling to said article receiving means.

4. In the article handling system according to claim 3, wherein said second path converges downwardly with respect to said first path at the approach to said section and diverges upwardly with respect to said first path at the end of said section, a third member normally carried by said article receiving means and having a pivot means at one end and a third follower remote therefrom, said article handling means including mechanism for receiving said pivot means in alignment with said second axis, and said second guide means having a portion for receiving said third follower.

5. In the article handling system according to claim 4, wherein said bottom part of the mold is pivoted to said base, and means for tilting said mold with respect to said base about the pivotal connection between said bottom part and said base.

6. In a system for molding ceramic and the like articles, in combination, a mold assembly including a carrier, a bottom mold part pivoted about a first axis on one side of said carrier, and a top mold part pivoted about a second axis parallel to the first axis but on the opposite side of said carrier, said top and bottom parts having first and second followers, respectively, remote from their respective pivot axes, means for continuously moving said carrier along a closed path, means for engaging said first follower to swing said top part of the mold away from the bottom part and expose a molded article therein, a second carrier, means for moving said second carrier along a second closed path different from the first path but with the two paths lying alongside each other at one section, said second path converging downwardly with respect to the first path at the approach to said section and diverging upwardly with respect to the first path at the end of said section, a counterpart for said top mold part normally carrier by said second carrier and including pivot means engageable and disengageable with said first carrier respectively, in response to the convergence at the approach to said section and the divergence at the end of said section, as aforesaid, said pivot means being located to coincide with said pivot axis of said bottom part of the mold when engaged with said first carrier, said counter part having a third follower remote from said pivot means, elongate guide means along said section normally aligned to receive said third follower and having a portion for receiving said second follower, and means for moving said guide means back and forth in an arcuate path having said pivot axis of said bottom part of the mold as its center to swing said counterpart over onto first carrier, pick up said second follower and swing said bottom part and said counterpart back over onto said second carrier.

7. In the system according to claim 6, including means for returning said bottom part to said first carrier.

8. In a system for molding ceramic and like articles, in combination, a mold assembly including a first carrier;

means for moving said first carrier along a first endless path during which movement and article is formed in the mould assembly and then transferred therefrom, a second carrier, means for moving said second carrier along a second closed path different from the first path but with the two paths lying alongside each other at one section whereat the article transfer is effected, said mould assembly also including a substantially horizontal bottom mould part pivoted on said first carrier about a first axis parallel to the movement of the first carrier and offset to one side thereof toward said second path along said one section, said bottom mould part having a follower spaced from said first axis by a predetermined amount toward the other side of said first carrier, said second carrier including a substantially horizontal support member pivoted thereto about a second axis parallel to the movement of the second carrier and disposed to lie on one side thereof coaxial with said first axis along said one section, said support member having a follower spaced from said second axis by said predetermined amount toward the other side of said support member, means for moving said first and second carriers in side-by-side synchronism along said one section, means disposed along said one section for selectively engaging said followers first to pivot said support member into overlying relation to said bottom mould part, then to pivot both said support member and said bottom mould part over onto said second carrier, and then to return said bottom mould part back to said first carrier, whereby said transfer of the article is effected.

9. In the system as claimed in claim 8, wherein the last mentioned means includes an arcuate track straddling said paths along said one section and having its center of curvature coincidental with said axes along said one section, and a carriage movable back and forth along said track.

10. In the system as defined in claim 9, wherein said mould assembly includes a top mould part overlying said bottom mould part and pivoted on said first carrier about a third axis extending along the direction of movement of said first carrier and disposed laterally beyond said follower of the bottom mould part by an amount sufficient to clear said arcuate track, said top mould part having a follower adjacent said first axis, and means for engaging the follower of said top mould part to swing the same to one side about its axis to clear said arcuate track.

11. In the system as defined in claim 10, wherein the means for engaging the follower to said top mould part includes an arcuate track having its center of curvature lying on said third axis, a carriage movable back and forth therealong, and a fixed guide engaging the follower of said top mould part to hold such top mould part substantially upright as it passes the first mentioned arcuate track.

\* \* \* \* \*